United States Patent Office 3,205,873
Patented Sept. 14, 1965

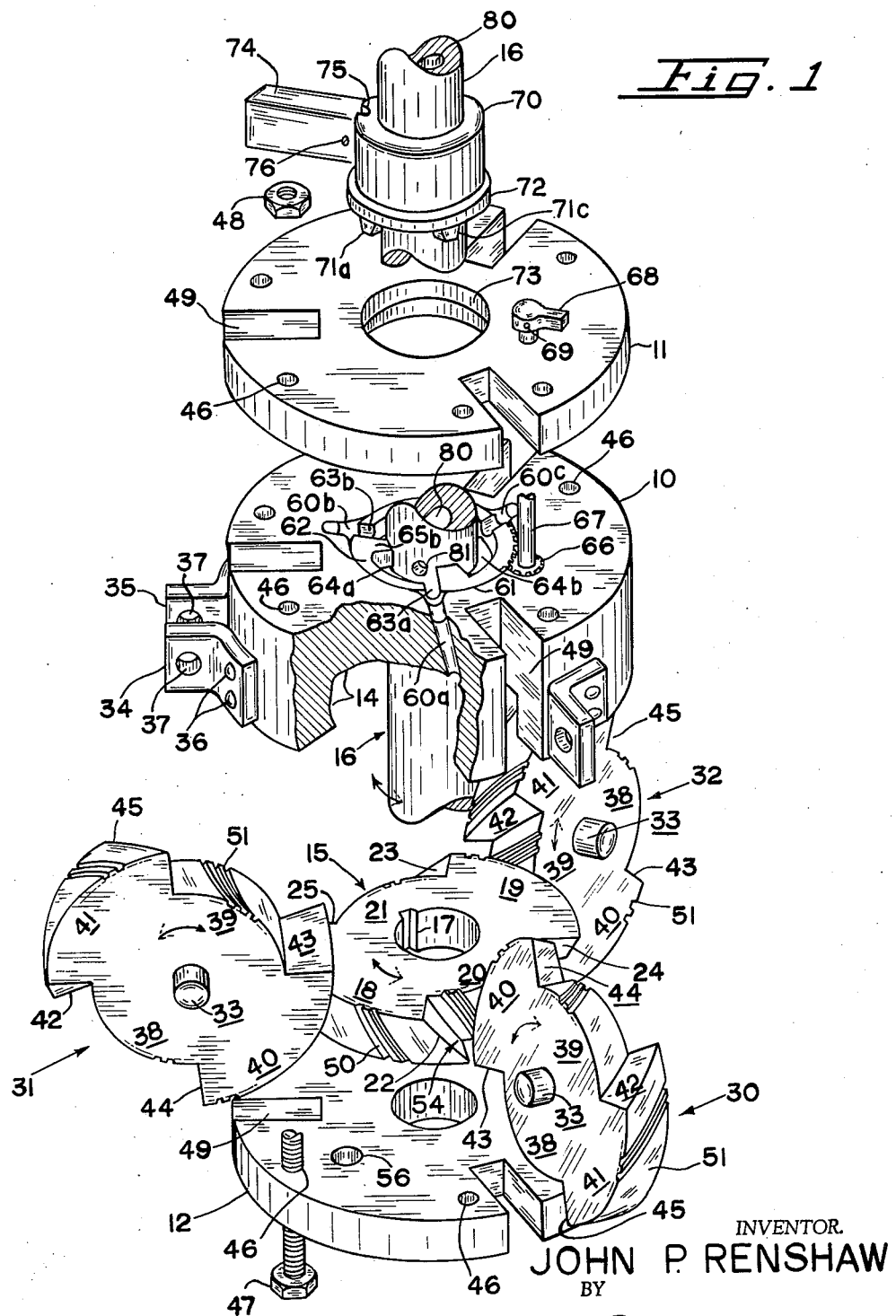

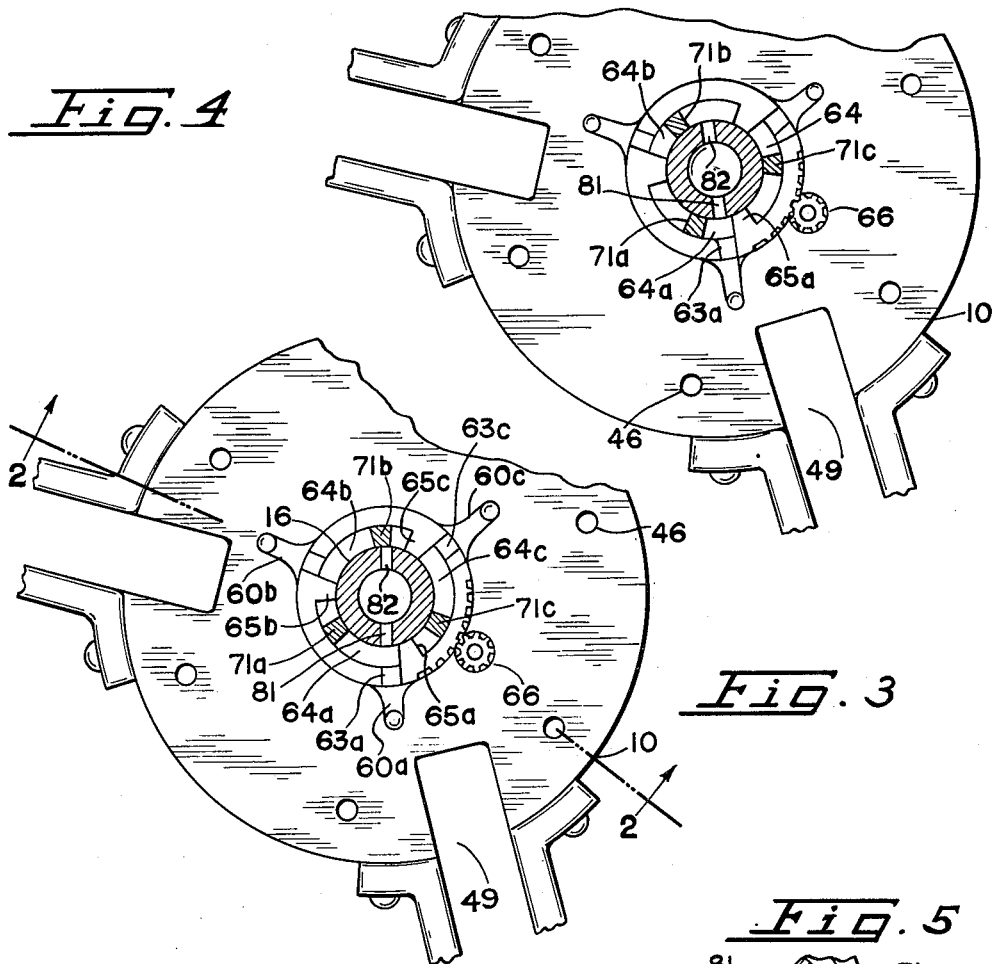
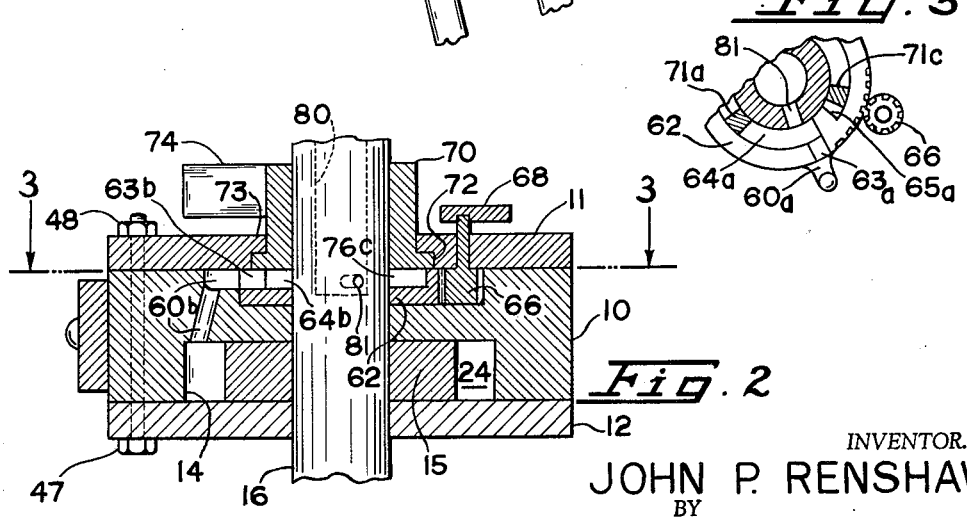

3,205,873
ADJUSTABLE VALVING ARRANGEMENT FOR POSITIVE DISPLACEMENT ROTARY TYPE ENERGY CONVERTING DEVICES
John P. Renshaw, 340 Pine St., San Francisco, Calif.
Filed Nov. 14, 1961, Ser. No. 152,349
6 Claims. (Cl. 123—13)

This invention relates to positive displacement rotary type energy converting devices and more particularly to adjustable valving arrangements for such devices.

Various types of rotary energy converting devices have been devised in which a power disk is rotatably mounted in a casing in cooperation with at least one abutment member to form a volume-changing, positive-displacement work chamber as the power disk rotates relative to the abutment member. For example, improved devices of this type are disclosed in my copending United States patent applications Serial No. 10,601, filed Feb. 24, 1950, now Patent No. 3,012,551, and Serial No. 127,431, filed July 10, 1961.

Although the rotary energy converting devices conceived prior to this invention operate successfully with fixed, non-adjustable type valvings, the general object of this invention is to provide adjustable valving means which will increase the utility of such devices.

As explained in detail in my copending United States patent application Serial No. 127,431, filed July 10, 1961, energy converting devices of the positive displacement rotary type can be used in several ways. They can be used as compression devices such as a pump or compressor and they can be used as expansion devices such as internal combution engines which are driven by fluid power hereinafter called in this specification and claims motors or rotary engines. Although adjustable valving is useful in all of these devices, perhaps the most important use is in connection with rotary engines. Thus, when such devices are used as rotary engines, the prior art arrangement is to open the high pressure fluid conduit into the work chamber at or near the instant the work chamber starts to form, and the conduit is closed when the work chamber has been fully formed. According to the present invention means are provided for adjusting the time at which the fluid conduit closes, or in other words adjusting the duration of the inlet time. Thus, if the high pressure inlet conduit is adjusted to remain open until the work chamber is completely expanded, the device will deliver maximum power because the power disk is being driven with fluid pressure throughout the entire expansion of the work chamber. However, if the inlet conduit is closed before the work chamber is completely expanded, the efficiency of the device is increased. The reason the efficiency is increased is that when the inlet is closed before the work chamber reaches maximum size, the high pressure driving fluid expands in the work chamber as the chamber increases in size, and therefore the spent gas exhausts through the outlet conduit at a pressure which is much closer to atmospheric pressure than if the inlet conduit remains open throughout the entire expansion of the work chamber. Since the valving is adjustable, the device can be adjusted for increased efficiency or increased power as conditions require. Also, the invention provides an adjustment for changing the instant at which the inlet conduit opens into the work chamber. The variation of the time for input into the work chamber is useful in correcting for mechanical variations of the motor and also provides a means for adjusting the input of gas into the working area at different time ratios for different speeds of operation so that the maximum efficiency can be obtained. In other words it may be desirable to provide a pulse of gas into the work chamber early in the case of high speed operation so that the time lag of gas transfer into the work chamber can be compensated for due to the lead time of pulse entry. Conversely, it may be desirable to program the entry of gas more closely to the beginning of the power phasing cycle.

Similarly, where positive displacement rotary devices are used as internal combustion engines, the utility can be improved by adjusting the instant at which the inlet conduit opens into the combustion chamber and also by adjusting the duration of the inlet time. Even where the devices are used as compressors, the utility of the devices can be increased by the valving arrangements of this invention. For example, in some cases it is desirable to have a compressor deliver a relatively continuous flow at moderate pressure and in other cases it is desirable to have a precompressed extremely high pressure delivery in spaced pulses. This variation can be obtained by adjusting the instant at which the outlet conduit is opened to the working chamber. If the outlet is opened as soon as the compression chamber starts compressing, a relatively continuous delivery of moderate pressure results. If the outlet opening is delayed until the compression chamber is partly compressed, an extremely high pressure pulse is obtained. It can also be seen that the inlet opening can be controlled so that the pulse will appear earlier for high speed operation than for lower speed operation thus insuring maximum efficiency of the device.

Some of the positive displacement rotary devices conceived prior to this invention have incorporated in a fixed valve manner certain of the concepts discussed in the foregoing explanation of the benefits of the adjustable valving arrangements of this invention. For example, in my copending United States patent application Serial No. 127,431, the outlet conduit to the compression chamber does not open until the chamber is almost fully compressed in order to obtain an extremely high pressure delivery. However, with fixed type valving, a design choice must be made and the device is not adjustable after it is manufactured.

Accordingly, another object of this invention is to provide positive displacement rotary energy converting devices with a valving arrangement which is adjustable after the device has been built.

A further object of the invention is to provide such devices with a valving arrangement which is adjustable while the device is operating.

An additional object of the invention is to provide a valving arrangement which is adjustable to change the instant at which the fluid conduit opens in relation to size of the work chamber.

A further object of the invention is to provide a valving arrangement which is adjustable to change the instant at which the fluid conduit closes in relation to the size of the work chamber.

Another object of the invention is to provide a valving arrangement which is adjustable to independently change both the instant at which the fluid conduit opens and the instant at which the fluid conduit closes, both in relation to the size of the work chamber.

A further object of the invention is to provide an efficient and inexpensive adjustable valving arrangement which employs an existing rotating shaft in the energy converting device as a distributing mechanism for the valving arrangement.

Other objects and features of advantage will be apparent from the following description read in conjunction with the accompanying drawings.

FIGURE 1 is an exploded perspective view of a positive displacement rotary type energy converting device incorporating the adjustable valving arrangement of this invention.

FIG. 2 is a cross-sectional view taken along line 2—2 in FIGURE 3 showing the valving parts in assembled rotation.

FIG. 3 is a view partly in section taken along the plane of line 3—3 in FIGURE 2 and showing the parts in assembled position.

FIGURE 4 is a view similar to FIGURE 3 showing an adjusted position of one of the adjustable parts.

FIGURE 5 is a view similar to FIGURE 3 showing an adjusted position of another of the adjustable parts.

Referring to the drawings in more detail, FIGURES 1 and 2 disclose a positive displacement rotary type energy converting device having a casing comprising a main casing member 10, a top plate 11 and a bottom plate 12.

The casing member 10 is provided at its lower end with a recess 14 receiving a power member or disk 15. Disk 15 is attached to a shaft 16 for rotation therewith, as for example by a conventional keyed attachment, the keyway therefor being shown on the disk at 17. Power disk 15 has large radius sections or projections 18 and 19, and small radius sections or recessed portions 20 and 21. The large and small radius sections merge at beveled edges 22, 23, 24 and 25. When the device is used as a rotary or internal combustion engine, the disk 15 rotates clockwise as viewed in FIGURE 1 and edges 22 and 23 are trailing edges while 24 and 25 are leading edges. When the device is used as a pump or compressor, disk 15 rotates counterclockwise and edges 22 and 23 are the leading edges while 24 and 25 are the trailing edges.

Power disk 15 is surrounded by one or more abutment disks, three such disks being shown at 30, 31 and 32. Each of the abutmennt disks is mounted on a shaft 33. Means are required for fixing shafts 33 in relation to the power disk, and one suitable means is shown in FIGURE 1 in the form of supporting ears 34 and 35. The ears are removably attached to casing 10 by means of screws or bolts 36 and are bored at 37 to receive shafts 33. In order not to confuse the showing of the more important parts of FIGURE 1, only one pair of ears 34, 35 is shown but it will be understood that an identical pair of ears is required for disk 30 and for disk 31. It should also be understood that the abutment disk can be covered by a protective screen or by solid casing, as described in detail in my copending United States patent application Serial No. 127,431, filed July 10, 1961. Each of the abutment disks has small radius sections or recessed portions 38 and 39 and large radius sections or projections 40 and 41. The large and small radius sections merge at beveled edges 42, 43, 44 and 45. When the device is operated so that the power disk rotates clockwise as shown by the solid arrowhead, the abutment disks also rotate in the direction shown by their solid arrowheads. Similarly, when the power disk is rotated counterclockwise as shown by its dashed arrowhead, the abutment disks rotate in the direction shown by their dashed arrowheads.

The power disk is sealed in place in the casing member by means of the bottom plate 12. The casing members 10, 11 and 12 are each drilled to provide six bolt receiving bores 46. The three casing members are held in assembled position as shown in FIGURE 2 by means of six bolts passing through bores 46. One such bolt is shown by way of example at 47 in FIGURE 1 as well as the associated nut 48. Casing members 10, 11 and 12 are each provided with three slots 49 for receiving the abutment disks.

Some means is required for rotating the abutment disks in synchronism with the power disk. This can, of course, be accomplished by external gear trains between shafts 16 and 33, but a most effective solution is to provide the power disk with gear teeth 50 meshing with gear teeth 51 on the abutment disks. This direct gear driving system is claimed per se in my copending United States patent application serial No 10,601, filed February 24, 1960, and is not claimed per se herein.

Irrespective of the type of synchronous driving mechanism for the disks, it will be noted that volume-changing work chambers are formed as the power disk 15 rotates relative to the abutment disks. More specifically the main work chambers are formed between the beveled edges 22 and 23 on the power disk and the large radius sections 40 and 41 on the abutment disks. One such work chamber is clearly visible at 54 in FIGURE 1. Obviously, if the device is used as a rotary or internal combustion engine, the chamber 54 will contain high pressure fluid and will be an expansion chamber driving power disk 15 in a clockwise direction (solid arrowhead). Of course, in the case of internal combustion use, ignition means, not shown, are required for chamber 54. If the device is used as a pump or compressor the power disk will be externally driven counterclockwise (dashed arrowhead) and chamber 54 will be a compression chamber. It will be understood from an analysis of FIGURE 1 that work chamber 54 is formed successively between beveled edge 22 and each of the three abutment disks as the power disk rotates relative to the abutment disks. Similarly a main work chamber is successively formed between the beveled edge 23 and the abutment disks. Additional work chambers are successively formed between beveled edges 24 and 25 of the power disk and the large radius sections of abutment disks. These adidtional chambers serve as exhaust chambers for spent fluid when the device is used as a rotary or internal combustion engine, and they serve as inlet chambers when the device is used as a pump or compressor. A passage for such exhaust or inlet is provided adjacent the counterclockwise face of each abutment disk as viewed from the top of FIGURE 1. One way such passages can be provided is by ports in the bottom plate 12, and one such port is shown at 56. For example, when the power disk is rotating clockwise as a rotary or internal combustion engine, work chamber 54 will be expanded by the high pressure fluid until the trailing edge 22 meshes with leading edge 45 on the abutment disk 31. After this occurs, leading edge 24 on the power disk will have passed abutment disk 30, and an exhaust chamber will be formed between leading edge 24 and the large radius section 41 on abutment disk 31. Obviously, as said leading edge 24 approaches disk 31 the spent fluid which was in chamber 54 will be forced out of the passage 56. Conversely, if the power disk 15 is rotated counterclockwise (dashed arrowhead) for pumping or compressing, the low pressure inlet fluid would have been drawn into chamber 54 when trailing edge 24 on the power disk passed abutment disk 31 ahead of leading edge 22. When trailing edge 24 passed abutment disk 31, it also passed over and opened inlet port 56 and also formed an expanding inlet chamber between itself and a large radius section of abutment disk 31.

The structure and operation of the power and abutment disks and the inlet or exhaust passages 56 are not claimed per se. herein. Rather, various details of these features are described and claimed in my aforementioned copending applications.

Coming now to the valving arrangement of the present invention it will be explained that the work chambers such as chamber 54 in FIGURE 1 are serviced by a fluid conduit formed by the following portions: three fluid passages 60 (a, b and c) are provided in casing member 10, one for each of the abutment disks. Passages 60 open at one end into the recess 14 closely adjacent the clockwise face of each power disk. Thus passages 60 open into the working chambers 54 as soon as the chambers are formed. The upper face of member 10 is provided with an oversized bore 61 surrounding shaft 16, and the other end of each passage 60 opens into bore 61. A timing sleeve 62 is seated in bore 61, and the rim of the sleeve is provided with three openings 63 (a, b and c) which communicate with passages 60 and with arcuate recesses 64 (a, b and c) spaced along the inner periphery of sleeve 62. The recessed sleeve 62 has three projections 65 (a, b and c) sealingly engaging the shaft 16 which rotates relative to the sleeve, and projections 65 serve as end walls for the recesses 64. Rotary adjustment of the sleeve 62 is accomplished by means of a small spur gear 66 having teeth meshing with teeth on the periphery of sleeve 62. Operation of this adjustment is made possible by shaft 67 having an external handle 68 held in place thereon by a screw 69. It will be noted that end walls 65 are fixed relative to each other but are movable relative to the passages 60.

An adjusting valve collar 70 sealingly receives shaft 16 which rotates therein. The lower end of the collar carries three circumferentially spaced projections 71 (a, b and c) which fit into the three recesses 64 to form one movable end wall in each of the recesses. FIGURES 2–5 shows the collar 70 in assembled relation with sleeve 62. It will be noted, particularly in FIGURE 2, that the collar 70 is provided with a rim 72 which is overlapped by an inwardly projecting rim 73 on top member 11 to hold the collar in place. It is also noted that the collar is provided with an adjusting handle 74. Thus it is apparent that the collar must be inserted in place before top plate 11. In order to permit this assembly process, the handle 74 is removable so that it can be attached after top plate 11 is seated. More specifically, the handle is provided with means such as a keyhole shaped projection 75 which fits axially into a matching slot in collar 70. In order to prevent axial displacement, the handle is provided with a screw 76 which passes through the flared inner end of the handle into a tapped bore in the collar.

It will be noted that the number of passages 60, the number of openings 63, the number of recesses 64 and the number of movable walls 71 is in each case equal to the number of abutment disks. See for example FIGURES 1 and 3. It should be understood that more or fewer abutment disks can be used and that in any case the number of each of the parts 60, 63, 64 and 71 should be equal to the number of abutment disks used.

The fluid conduit for the work chamber 54 is completed by means of a hollow portion 80 in shaft 16 and two distributing ports 81 and 82 opening radially from hollow portion 80 through the wall of the shaft. A conventional fluid line and rotary fluid seal (not shown) can be attached to the open upper end of shaft 16 to carry fluid to or from a point remote from the device of FIGURE 1. There are as many distributing ports 81 and 82 as there are large radius sections or projections 18 and 19 on the power disk. Thus since the power disk embodiment shown in FIGURE 1 employs two projections, there are two distributing ports as shown in FIGURES 3–5. It should be understood that more or less than two projections can be used on the power disk, and that in any case the number of distributing ports must equal the number of projections on the power disk.

Operation of the valving arrangement can be best understood by an analysis of FIGURE 1 and a comparison of FIGURES 3–5. FIGURE 3 shows the parts in assembled position with the same rotary positions shown in FIGURE 1. FIGURE 4 shows all parts in the same position as FIGURE 3 except that movable walls 71 (a, b and c) have been rotated counterclockwise. FIGURE 5 shows all parts in the same position as FIGURE 3 except that the timing sleeve 62 has been rotated slightly counterclockwise.

Thus, when the device is operated as a turbine, for example, high pressure fluid is introduced through the hollow upper end of shaft 16, which in the case of turbine operation rotates clockwise as shown by the solid arrowhead in FIGURE 1. The fluid in the shaft is delivered successively to the three recesses 64 (a, b and c) by each of the ports 81 and 82 as the shaft rotates and the distributor ports are intermittently opened and closed by projections 65. When the shaft is in the position shown in FIGURES 1 and 3, the port 81 opens into the recess 64a which feeds the high pressure fluid to the expansion work chamber 54 formed adjacent the abutment disk 30. The fluid passes from recess 64a to the work chamber via the associated opening 63a and passages 60a. Obviously, as port 81 rotates into communication with the other two recesses 64 (b and c) the high pressure fluid will be fed in succession to the work chambers formed adjacent abutment disks 31 and 32, in that order as the trailing edge 22 on the power disk passes disks 31 and 32, in like manner as it has just passed abutment disk 30 in FIGURE 1. Port 82 will, of course, similarly deliver fluid to the work chambers formed as trailing edge 23 passes the abutment disks.

With the parts in the positions shown in FIGURES 1 and 3, fluid is being admitted to the work chamber 54, and such admission started as soon as port 81 passed the counterclockwise adjacent projection. The admission of fluid will continue until the port 81 is covered by movable wall 71a. Thus, the duration of delivery of fluid to work chamber 54 is controlled by the position of wall 71a. If wall 71a is moved counterclockwise as shown in FIGURE 4, the duration is reduced. As previously explained, this reduces the total power but increases the efficiency. Of course, if wall 71a is moved clockwise from FIGURE 3, the duration of delivery and total power are increased and the efficiency is reduced. An additional adjustment can be obtained by movement of projection 65a to change the time at which delivery commences. Thus, if projection 65a is moved counterclockwise as shown in FIGURE 5, delivery will commence sooner; that is, when chamber 54 is smaller, or even before it is formed. Of course, if wall 71a is moved clockwise the starting time of delivery will be postponed until chamber 54 is larger.

Although the valving adjustments have been described in detail only with regard to port 81 and the series-*a* parts, it is believed obvious that the same discussion applies to the series-*b* and *c* parts and to the port 82. Accordingly, the same type of presentation will be issued in the following explanation of the operation of the valving arrangement when the device is used as an internal combustion engine or compressor.

It should be apparent to anyone versed in the art that the above principles could be applied to any energy converting device involving the use of controlled time phased intermittent pulses of fluid so as to adjustably obtain the most effective desired degree of gas transfer.

Although the foregoing invention has been described in some detail by way of illustration and example for purposes of clarity of understanding, it is understood that certain changes and modifications may be practiced within the spirit of the invention as limited only by the scope of the appended claims.

In the claims:

1. In a positive displacement energy converting device of the type having a casing, a power disk rotatably mounted in said casing, at least one abutment disk rotatably mounted on said casing with the outer portion of said abutment disk being in sealed association with the outer portion of said power disk during rotation of said disks, means for rotating said abutment disk in synchronism with said power disk, said power disk having at least one projection on its outer portion and said abutment disk having at least one recessed portion receiving said projection during rotation of said disks, and a volume-changing work chamber formed between the walls of said casing and the power disk and the non-recessed portion of said abutment disk and one edge of said projection, the improvement comprising: a shaft connected to said power disk and having an axially disposed hollow portion, said casing having a fluid passage opening into said work chamber, a rotatably adjustable timing sleeve seated in said casing around said hollow portion of said shaft, said timing sleeve having an arcuate recess on its inner surface adjacent said hollow portion of said shaft and spaced from the outer surface of said shaft, and a projection in said sleeve closing said recess and sealingly engaging said outer surface of said shaft, an opening in the outer surface of said sleeve interconnecting said arcuate recess and said fluid passage, said shaft having a passage opening at its radially inner end into said hollow portion of the shaft, the radially outer end of said passage being alternately open into said arcuate recess and closed by the inner periphery of said sleeve projection as the shaft rotates relative to the sleeve, a movable end wall member in said arcuate recess, and means for moving said end wall member toward and away from said opening in the timing sleeve.

2. In an energy converting device as claimed in claim 1 of the type having a plurality of said abutment disks and a plurality of said projections on the power disk the improvement comprising: a plurality of said passages, recess and wall members each equal in number to the number of said abutment disks, and a plurality of said ports equal in number to the number of said projections.

3. A positive displacement energy converting device having a casing, a power member rotatably mounted in said casing, an abutment member cooperating with said power member to form a volume-changing work chamber as said power member is rotated relative to said abutment member, valving mechanism comprising a shaft connected to said power member and having an axially disposed hollow portion, a rotatably adjustable timing sleeve surrounding said shaft, said timing sleeve having an arcuate recess on its inner surface adjacent said shaft, said shaft having a port opening at its radially inner end into said axially disposed hollow portion of said shaft, the radially outer end of said port being alternately open into said arcuate recess and closed by the inner periphery of said sleeve as the shaft rotates relative to the sleeve and spaced from the outer surface of said shaft, and a projection in said sleeve closing said recess and sealingly engaging said outer surface of said shaft, an opening in the outer surface of said sleeve therethrough communicating with said recess, and said casing having a fluid passage therein connecting said opening in the sleeve to said work chamber.

4. An energy converting device as claimed in claim 3 comprising a plurality of said work chambers, and a plurality of said recesses and passages each equal in number to the number of said work chambers.

5. A rotary positive displacement energy converting device comprising a casing, a power disk rotatably mounted in a disk receiving chamber in said casing, an abutment disk mounted on said casing with the outer portion of said abutment disk being in sealed association with the outer portion of said power disk during rotation of said disks, means for rotating said abutment disk in synchronism with said power disk, said power disk having at least one projection on its outer portion and said abutment disk having at least one recessed portion receiving said projection during rotation of said disks whereby a work chamber is formed between said projection and said abutment disk during rotation of said disks, a fluid passage in said casing opening into said disk receiving chamber adjacent said abutment disk, a shaft connected to said power disk for rotation therewith, said casing having an oversize bore receiving said shaft, a timing sleeve received in said bore, said sleeve having a portion of its inner periphery in sealing engagement with said shaft and another portion of its inner periphery indented to form an arcuate recess part way around said shaft, said sleeve having an opening connecting one end of said recess with said fluid passage, means for adjusting the rotational position of said sleeve relative to said casing, a collar received on said shaft adjacent said sleeve, said collar being rotatable relative to said casing and said sleeve, a projection on said collar extending into said recess and forming a movable end wall therein, said shaft having a hollow portion, and a port in said shaft connecting said hollow portion to said recess as said shaft rotates relative to said sleeve.

6. A rotary positive displacement energy converting device comprising a casing, a power disk rotatably mounted in a disk receiving chamber in said casing, an abutment disk mounted on said casing with the outer portion of said abutment disk being in sealed association with the outer portion of said power disk during rotation of said disks, means for rotating said abutment disk in synchronism with said power disk, said power disk having at least one projection on its outer portion and said abutment disk having at least one recessed portion receiving said projection during rotation of said disks whereby a work chamber is formed between said projection and said abutment disk during rotation of said disks, a fluid passage in said casing opening into said disk receiving chamber adjacent said abutment disk, a shaft connected to said power disk for rotation therewith, said casing having an oversize bore receiving said shaft, a timing sleeve received in said bore, said sleeve having a portion of its inner periphery in sealing engagement with said shaft and another portion of its inner periphery indented to form an arcuate recess part way around said shaft, said sleeve having an opening connecting one end of said recess with said fluid passage, means for adjusting the rotational position of said sleeve relative to said casing, a collar received on said shaft adjacent said sleeve, said collar being rotatable relative to said casing and said sleeve, a projection on said collar extending into said recess and forming a movable end wall therein, said shaft having a hollow portion, a port in said shaft connecting said hollow portion to said recess as said shaft rotates relative to said sleeve, a cover plate on said casing sealingly covering said sleeve, said collar having an outwardly projecting rim thereon, and said cover plate having a bore receiving said collar and overlapping said rim to hold said collar against movement away from said sleeve.

References Cited by the Examiner

UNITED STATES PATENTS

| 453,173 | 5/91 | Fitch | 121—144 |
|---|---|---|---|
| 610,084 | 8/98 | Richards et al. | 121—71 |
| 676,179 | 6/01 | Elliott | 121—142 |
| 690,743 | 1/02 | La Burt | 121—142 |
| 731,161 | 6/03 | Carleton | 121—142 |
| 792,625 | 6/05 | Staahlgren | 121—71 |
| 865,964 | 9/07 | Bleecker | 121—71 |
| 960,991 | 6/10 | Motsinger | 121—71 |
| 1,001,676 | 8/11 | Ostergren | 121—71 |
| 1,647,561 | 11/27 | Coward | 121—142 |
| 1,751,843 | 3/30 | Rosett | 121—71 |

KARL J. ALBRECHT, *Primary Examiner.*

JOSEPH H. BRANSON, JR., *Examiner.*